(12) United States Patent
Novitsky et al.

(10) Patent No.: US 9,038,428 B2
(45) Date of Patent: *May 26, 2015

(54) SPIN FORMING METHOD

(75) Inventors: Michael R. Novitsky, Slatington, PA (US); Earl Haas, Franklin, IN (US)

(73) Assignee: Victaulic Company, Easton, PA (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/597,298

(22) Filed: Aug. 29, 2012

(65) Prior Publication Data

US 2013/0055780 A1 Mar. 7, 2013

Related U.S. Application Data

(60) Provisional application No. 61/530,771, filed on Sep. 2, 2011.

(51) Int. Cl.
*B21D 17/04* (2006.01)
*B21D 41/00* (2006.01)
*B21D 39/04* (2006.01)
(Continued)

(52) U.S. Cl.
CPC ............... *B21D 17/04* (2013.01); *B21D 41/00* (2013.01); *B21D 39/046* (2013.01); *B21D 41/023* (2013.01); *B21D 15/06* (2013.01); *F16L 25/12* (2013.01); *F16L 21/022* (2013.01); *B21D 22/16* (2013.01)

(58) Field of Classification Search
CPC ...... B21D 15/06; B21D 17/04; B21D 19/046; B21D 22/14; B21D 22/16; B21D 39/08; B21D 39/10; B21D 39/12; B21D 39/18; B21D 39/20; B21D 41/02; B21D 41/026; B21D 47/02; B21D 51/10; B21D 51/12; B21D 51/18; B21D 51/38
USPC ......... 72/74, 77–78, 105–106, 112–113, 115, 72/117–118, 120, 122–126, 370.01, 72/370.06, 370.08, 370.21, 370.16, 72/370.17; 29/506–508
See application file for complete search history.

(56) References Cited

U.S. PATENT DOCUMENTS

| 40,967 A | 12/1863 | Vanguysling |
| 433,271 A | 7/1890 | Chamberlain |

(Continued)

FOREIGN PATENT DOCUMENTS

| CN | 201102044 Y | 8/2008 |
| EP | 0432485 | 6/1994 |

(Continued)

OTHER PUBLICATIONS

Copenheaver, Blaine R.—PCT International Search Report and Written Opinion regarding International Application No. PCT/US2011/062563, May 30, 2012.

(Continued)

*Primary Examiner* — Peter DungBa Vo
*Assistant Examiner* — Joshua D Anderson
(74) *Attorney, Agent, or Firm* — Ballard Spahr LLP

(57) ABSTRACT

A method of forming a groove in a pipe element by spin forming wherein the pipe element is pinched between an arbor revolving in an eccentric orbit of expanding diameter within the pipe element and an outer die which captures the pipe element. The pinching action causes a portion of the pipe element to move radially inwardly away from the die contrary to the direction of the motion of the arbor.

26 Claims, 13 Drawing Sheets

(51) Int. Cl.
  *B21D 41/02* (2006.01)
  *B21D 15/06* (2006.01)
  *F16L 25/12* (2006.01)
  *F16L 21/02* (2006.01)
  *B21D 22/16* (2006.01)

(56) References Cited

U.S. PATENT DOCUMENTS

| | | |
|---|---|---|
| 514,588 A | 2/1894 | Coles |
| 818,843 A | 4/1906 | McCormick |
| 856,896 A | 6/1907 | McCormick |
| 1,472,047 A | 5/1922 | Carlson |
| 1,582,525 A | 4/1926 | Lucas |
| 2,355,852 A | 4/1944 | Fisher |
| 2,933,124 A | 4/1960 | Benson et al. |
| 3,122,830 A * | 3/1964 | Dawson et al. ............ 72/364 |
| 3,290,914 A | 12/1966 | Vaill et al. |
| 3,311,971 A | 4/1967 | Hicks et al. |
| 3,364,709 A | 1/1968 | Scann |
| 3,382,693 A | 5/1968 | Rozhdestvensky et al. |
| 3,648,500 A * | 3/1972 | Vaill .......................... 72/71 |
| 3,680,341 A | 8/1972 | Finn, Jr. |
| 3,738,139 A | 6/1973 | Proops et al. |
| 3,787,945 A | 1/1974 | Pasek et al. |
| 3,906,771 A | 9/1975 | Martin |
| 4,102,168 A | 7/1978 | Brookes et al. |
| 4,114,414 A * | 9/1978 | Goodman .................... 72/105 |
| 4,134,286 A | 1/1979 | Martin |
| 4,143,535 A | 3/1979 | Bouman |
| 4,311,248 A | 1/1982 | Westerlund et al. |
| 4,319,472 A | 3/1982 | Martin |
| 4,413,395 A | 11/1983 | Garnier |
| 4,522,433 A | 6/1985 | Valentine et al. |
| 4,615,198 A | 10/1986 | Hawkins et al. |
| 4,646,548 A | 3/1987 | Zimmerli et al. |
| 4,706,355 A | 11/1987 | Kuhns et al. |
| 4,716,752 A | 1/1988 | Diller |
| 4,796,457 A | 1/1989 | Iijima |
| 4,845,972 A | 7/1989 | Takeuchi et al. |
| 4,942,751 A | 7/1990 | Fuchs, Jr. |
| 5,080,400 A | 1/1992 | Adamek |
| 5,184,495 A | 2/1993 | Chunn et al. |
| 5,209,527 A | 5/1993 | Hohmann et al. |
| 5,327,756 A | 7/1994 | Fox |
| 5,450,738 A | 9/1995 | Chatterley et al. |
| 5,531,370 A | 7/1996 | Rohrberg |
| 5,564,184 A | 10/1996 | Dinh |
| 5,570,603 A | 11/1996 | Chatterley et al. |
| 5,826,920 A | 10/1998 | Bartholomew |
| 5,904,063 A | 5/1999 | Owens |
| 5,956,988 A | 9/1999 | Beste et al. |
| 6,032,502 A | 3/2000 | Halasz et al. |
| 6,196,039 B1 * | 3/2001 | Williams et al. ............ 72/105 |
| 6,233,991 B1 | 5/2001 | Thimmel et al. |
| 6,324,883 B1 | 12/2001 | Rennehvammen |
| 6,708,548 B2 | 3/2004 | Ehrke et al. |
| 6,843,096 B2 | 1/2005 | Viegener et al. |
| 6,959,576 B2 | 11/2005 | Hastings et al. |
| 7,114,358 B2 | 10/2006 | Lamb |
| 7,174,759 B2 | 2/2007 | Massee |
| 7,216,521 B2 | 5/2007 | Ogawa |
| 7,225,660 B1 | 6/2007 | Ledebur |
| 7,251,974 B2 | 8/2007 | Massee |
| 7,296,451 B2 * | 11/2007 | Dole .......................... 72/105 |
| 7,316,142 B2 | 1/2008 | Lancaster |
| 7,341,287 B2 | 3/2008 | Gibb et al. |
| 7,364,206 B2 | 4/2008 | Romanelli et al. |
| 7,415,765 B2 | 8/2008 | Ozawa |
| 7,490,499 B2 | 2/2009 | Suzuki et al. |
| 7,506,897 B2 | 3/2009 | Bauer |
| 7,967,031 B2 | 6/2011 | Esser |
| 8,777,277 B2 * | 7/2014 | Dole et al. .................. 285/367 |
| 2002/0108426 A1 | 8/2002 | Roe et al. |
| 2003/0038481 A1 | 2/2003 | Viegener |
| 2004/0255632 A1 | 12/2004 | Dole et al. |
| 2005/0167977 A1 | 8/2005 | Ozawa |
| 2005/0212284 A1 | 9/2005 | Dole |
| 2007/0204666 A1 | 9/2007 | Suzuki et al. |
| 2009/0189391 A1 | 7/2009 | Ferlin et al. |
| 2010/0140920 A1 | 6/2010 | Kloss et al. |
| 2014/0260480 A1 * | 9/2014 | Novitsky et al. ............ 72/113 |

FOREIGN PATENT DOCUMENTS

| | | |
|---|---|---|
| EP | 0432485 B1 | 6/1994 |
| JP | 55-036071 | 3/1980 |
| JP | 55036071 | 3/1980 |
| JP | 61-186135 | 8/1986 |
| JP | 61186135 | 8/1986 |
| JP | 09-053772 | 2/1997 |
| JP | 09053772 | 2/1997 |
| JP | 2003-340539 | 2/2003 |
| JP | 2003340539 | 2/2003 |
| SU | 445496 | 10/1974 |
| SU | 730420 | 4/1980 |
| SU | 1787625 | 1/1993 |
| SU | 1787625 A1 | 1/1993 |

OTHER PUBLICATIONS (Copenheaver, Blaine R.) PCT International Search Report and Written Opinion regarding International Application No. PCT/US2011/062563, May 30, 2012.

Copenheaver, Blaine R.; PCT International Search Report and Written Opinion regarding International Application No. PCT/US2012/052793, Nov. 6, 2012.

Vinci, Vincenzo; Supplementary European Search Report from corresponding European patent application No. 12827775; pp. 1-2; Oct. 1, 2014; European Patent Office; Munich, Germany.

Vinci, Vincenzo; European Search Opinion from corresponding European patent application No. 12827775; pp. 1-2; Oct. 1, 2014; European Patent Office; Munich, Germany.

\* cited by examiner

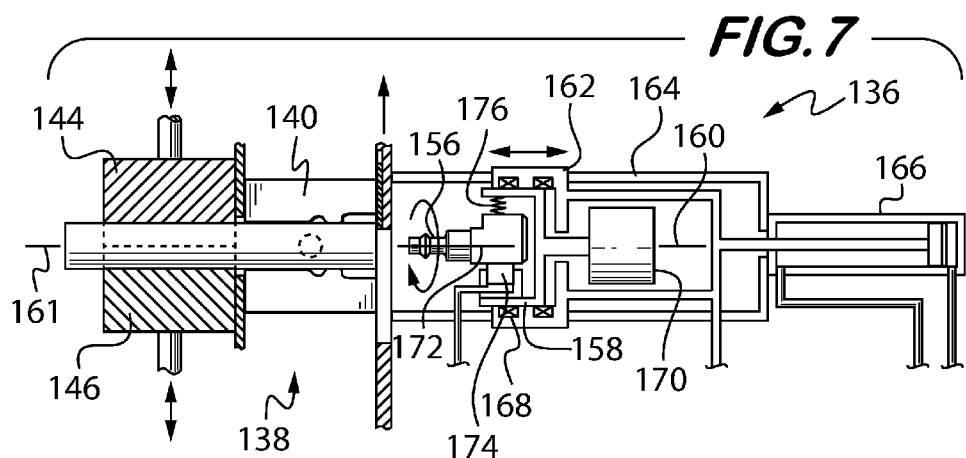
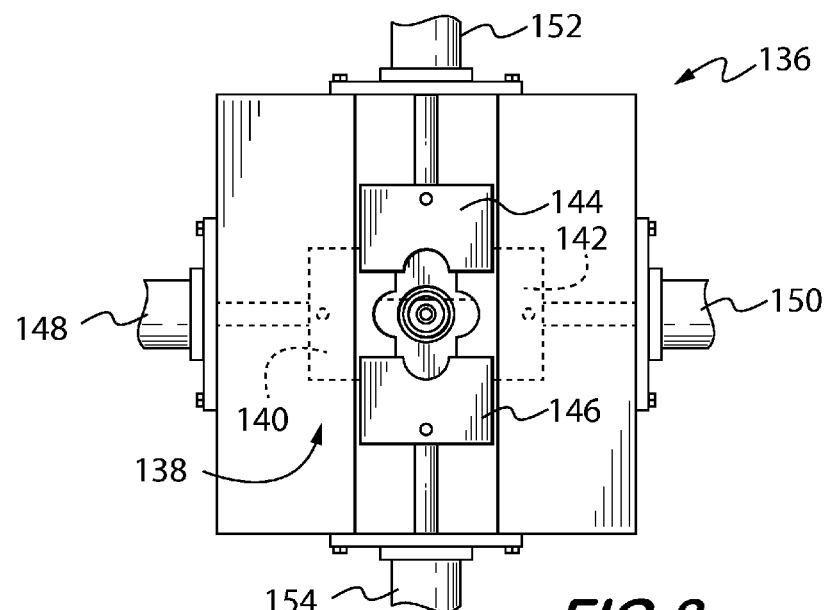

SPIN FORMING METHOD

CROSS REFERENCE TO RELATED APPLICATION

This application is based upon and claims the benefit of priority to U.S. Provisional Patent Application No. 61/530,771, filed Sep. 2, 2011, and hereby incorporated by reference in its entirety.

FIELD OF THE INVENTION

This invention relates to methods of spin forming pipe elements to create a shoulder, groove and bead proximate to the ends thereof.

BACKGROUND

Various challenges are encountered when designing pipe elements to be joined by mechanical pipe couplings. Such couplings comprise two or more coupling segments joined in end to end relation by threaded fasteners, an example of which is disclosed in U.S. Pat. No. 7,712,796, hereby incorporated by reference. The segments surround a central space which receives the pipe elements. Each segment has a pair of arcuate surfaces known as "keys" which engage the outer surfaces of the pipe elements, the keys often being received in circumferential grooves in the pipe elements which provide a positive mechanical engagement against bending and axial loads applied to the joint. Each segment also defines a channel between its pair of arcuate surfaces which receives a ring-shaped gasket. The gasket is typically compressed between the segments and the pipe elements to effect a fluid tight joint.

Circumferential grooves are advantageously formed by cold working the sidewall of the pipe element because, unlike cut grooves, material is not removed from the pipe sidewall and thus thinner walled pipe elements may be grooved by the cold working process. It is advantageous to use thinner walled pipe elements for weight and cost savings in high pressure and/or high load applications. However, prior art cold working methods and pipe designs do not produce coupling and pipe element engagement features adequate for high loads and pressures sustainable by comparable cut groove systems used on thicker walled pipe elements. There are clear advantages to be had through improvements to the design and manufacture of thin walled grooved pipe elements by cold working which will allow thin walled grooved pipe elements to be joined by mechanical couplings and used in high pressure/high load applications.

SUMMARY

The invention concerns a method of forming a groove in an outer surface of a pipe element. In one example embodiment, the method comprises:
  capturing an end of the pipe element in a die having first and second circumferential troughs arranged in spaced apart relation to one another;
  inserting an arbor within the pipe element, the arbor having a first circumferential rib aligned with the first circumferential trough and a second circumferential rib aligned with the second circumferential trough;
  revolving the arbor in an orbit about a longitudinal axis of the die;
  increasing the diameter of the orbit while revolving the arbor so as to force the arbor against an inner surface of the pipe element;
  pinching the pipe element between the first circumferential rib and the first circumferential trough while revolving the arbor in the orbit of increasing diameter, thereby causing a portion of the pipe element between the first and second circumferential troughs to move radially inwardly away from the die thereby forming the groove, the groove having a smaller outer diameter than the outer diameter of the remainder of the pipe element.

In this example embodiment the first circumferential trough comprises a first side surface positioned proximate to the second circumferential trough, and a second side surface positioned distal to the second circumferential trough. A floor surface extends between the first and second side surfaces. The example method further may comprise pinching the pipe element between the first circumferential rib and the first side surface.

The first side surface may be oriented at a first orientation angle, the second side surface may be oriented at a second orientation angle. The first orientation angle may be less than the second orientation angle when measured relatively to a datum line extending perpendicular to the longitudinal axis of the die.

In a particular example embodiment the first circumferential rib comprises first and second flank surfaces positioned on opposite sides thereof. The first flank surface faces toward the first side surface, and the second flank surface faces toward the second side surface. In this example embodiment the pipe element is pinched between the first flank surface and the first side surface. At least the first flank surface may be angularly oriented with respect to a datum line extending perpendicular to the longitudinal axis of the die.

In an example embodiment, the second circumferential trough may comprise a side surface positioned proximate the first circumferential trough and a floor surface contiguous with the side surface of the second circumferential trough. The example method may further comprise pinching the pipe element between the second circumferential rib and the side surface of the second circumferential trough. The side surface of the second circumferential trough may be oriented substantially perpendicular to the longitudinal axis of the die.

In another example embodiment, the second circumferential rib may comprise a flank surface facing toward the side surface of the second circumferential trough. In this example embodiment, the method further comprises pinching the pipe element between the flank surface of the second circumferential rib and the side surface of the second circumferential trough. The flank surface of the second circumferential rib may be angularly oriented with respect to a datum line extending perpendicular to the longitudinal axis of the die.

The method according to the invention may further comprise, by way of example, forming a shoulder in an end portion of the pipe element by forcing the second circumferential rib toward the second circumferential trough. Additionally, the method may further comprise forming a bead in the pipe element adjacent to the groove by forcing the first circumferential rib toward the first circumferential trough.

In another example embodiment the method includes forming a bead, a groove and a shoulder in an outer surface of a pipe element. In one example embodiment, the method comprises:
  capturing an end of the pipe element in a die having first and second circumferential troughs arranged in spaced apart relation to one another;
  inserting an arbor within the pipe element, the arbor having a first circumferential rib aligned with the first circumferential trough and a second circumferential rib aligned with the second circumferential trough;

revolving the arbor in an orbit about a longitudinal axis of the die;

increasing the diameter of the orbit while revolving the arbor so as to force the arbor against an inner surface of the pipe element;

forming the bead by forcing the first circumferential rib toward the first circumferential trough;

forming the shoulder by forcing the second circumferential rib toward the second circumferential trough;

the groove being formed between the bead and the shoulder by pinching the pipe element between the first circumferential rib and the first circumferential trough while revolving the arbor in the orbit of increasing diameter, thereby causing a portion of the pipe element between the first and second circumferential troughs to move radially inwardly away from the die thereby forming the groove, the groove having a smaller outer diameter than the outer diameter of the remainder of the pipe element.

BRIEF DESCRIPTION OF THE DRAWINGS

FIG. 7 is a schematic diagram of an example spin forming machine for manufacturing pipe elements using a spin forming method;

FIG. 8 is a schematic end view of the spin forming machine shown in FIG. 7;

DETAILED DESCRIPTION

Figure 1:
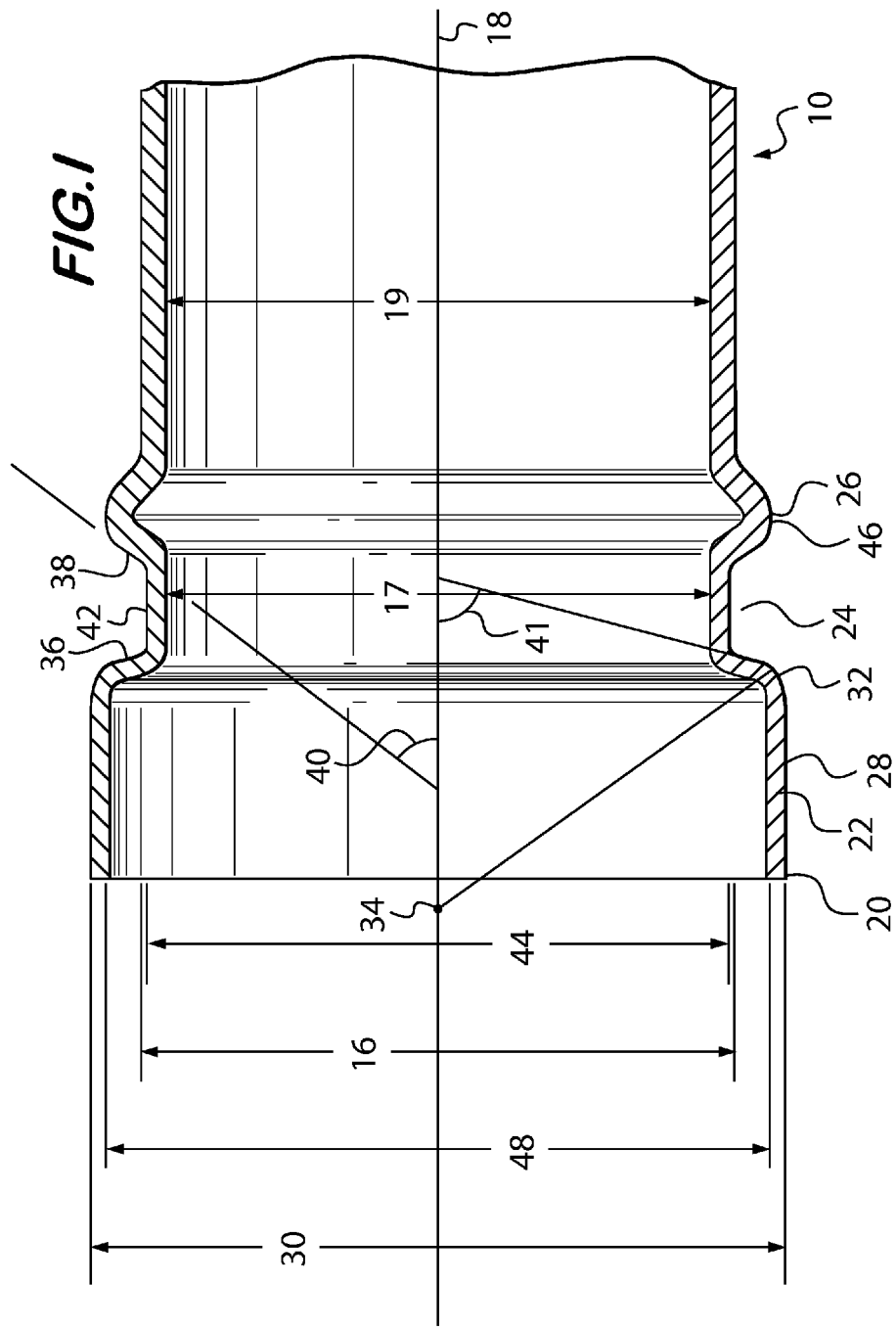
FIG. 1 is a longitudinal sectional view of an example pipe element formed by the spin forming process according to the invention.
Figure 2:
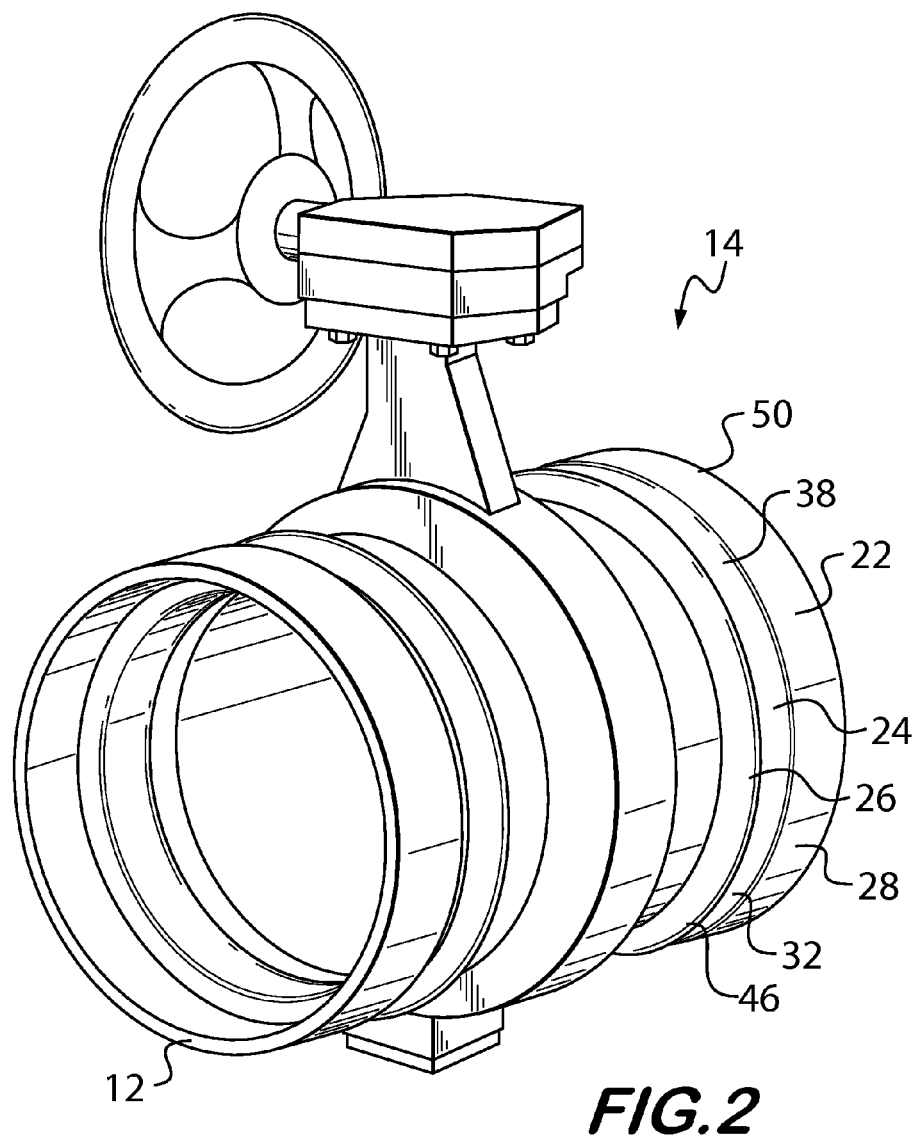
FIG. 2 is an isometric view of a valve including an example pipe element formed by the spin forming process according to the invention.

The invention concerns pipe elements, combinations of pipe elements and couplings, and methods and devices for cold working pipe elements to receive couplings and form a fluid tight joint. Throughout this document the term "pipe element" means any tubular structure, including, for example, pipe stock 10 as shown in FIG. 1, as well as the tubular portion 12 of a fluid handling or control component such as the valve 14 shown in FIG. 2. Other components, such as pumps and strainers, as well as fittings such as tees, elbows, bends and reducers are also included as having or comprising "pipe elements" as defined herein.

As shown in FIG. 1, pipe element 10 has an outer diameter 16 which passes through a point on a longitudinal axis 18 at the pipe element's center of curvature. At least one end 20 of pipe element 10 is configured to receive a key of a mechanical coupling (not shown), the configuration comprising a shoulder 22 positioned at the end 20, a groove 24 positioned adjacent to the shoulder 22, and a bead 26 positioned contiguous with the groove 24.

As illustrated in detail in FIG. 1, shoulder 22 extends circumferentially around the pipe element and has an outwardly facing surface 28. Surface 28 has an outer diameter 30 that is greater than the outer diameter 16 of the pipe element 10 excluding the shoulder 22. Shoulder 22 also has an outwardly facing curved surface 32. Curved surface 32 also extends circumferentially around the pipe element and has a center of curvature on an axis 34 oriented perpendicular to the longitudinal axis 18 of the pipe element 10. In FIG. 1, axis 34 is shown perpendicular to the viewing plane and is therefore seen end on.

Groove 24 is defined by a first side surface 36 which is positioned contiguous with the curved surface 32 of the shoulder 22. Side surface 36 in this example embodiment is oriented substantially perpendicularly to longitudinal axis 18, but may also be oriented angularly in other embodiments, as measured by orientation angle 41 shown in FIG. 1. "Substantially perpendicular" as used herein refers to an angular orientation which may not be exactly perpendicular, but is established as close as practicable in view of manufacturing practices and tolerances. Perpendicular orientation of the first side surface 36 stiffens the pipe element radially and helps it maintain its roundness.

A second side surface 38 further defines the groove 24. Second side surface 38 is positioned in spaced apart relation to the first side surface 36 and is oriented angularly with respect to the longitudinal axis 18. Side surface 38 may have an orientation angle 40 from about 40° to about 70°, or about 45° to about 65°. In the particular embodiment shown in FIG. 1, orientation angle 40 is about 55°, which is considered advantageous when the groove receives keys of a mechanical coupling as shown in FIGS. 3-6.

A floor surface 42 extends between the first side surface 36 and the second side surface 38 of groove 24. In the example embodiment shown, the floor surface 42 is substantially parallel to the longitudinal axis 18 and has an outer diameter 44 which is less than the outer diameter 16 of the pipe element excluding the groove. The groove 24 also has an inner diameter 17 which, in the embodiment shown in FIG. 1, is approximately equal to the inner diameter 19 of the pipe element 10.

Bead 26 is positioned contiguous with the second side surface 38 of the groove 24 and also extends circumferentially around the pipe element. The bead 26 projects outwardly away from axis 18 and has an apex 46 with an outer diameter 48 greater than the outer diameter 16 of the pipe element excluding the bead. In the example embodiment shown in FIG. 1, the diameter 48 of the apex 46 is less than the outer diameter 30 of shoulder 22. Bead 26 increases the radial stiffness of the pipe element and thereby helps maintain its roundness.

Figure 3:
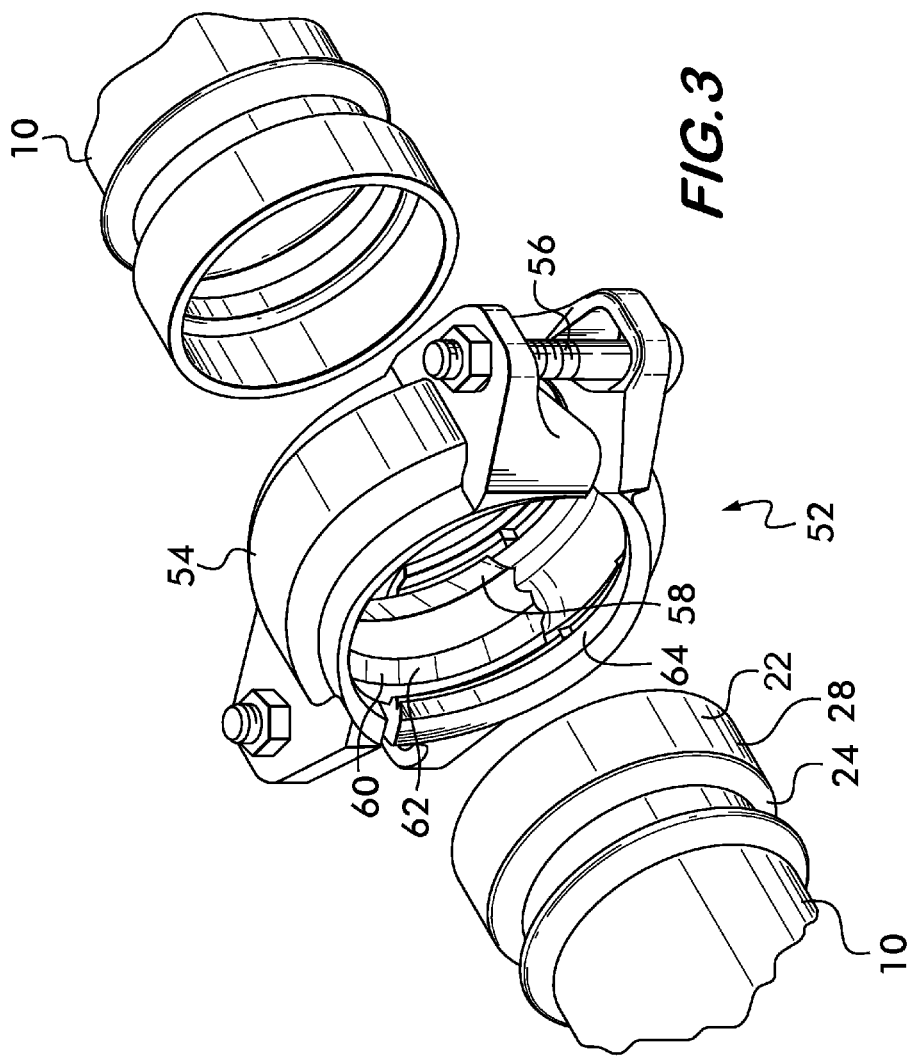
FIG. 3 is an exploded isometric view of a combination of pipe elements and a pipe coupling.
Figure 3A:
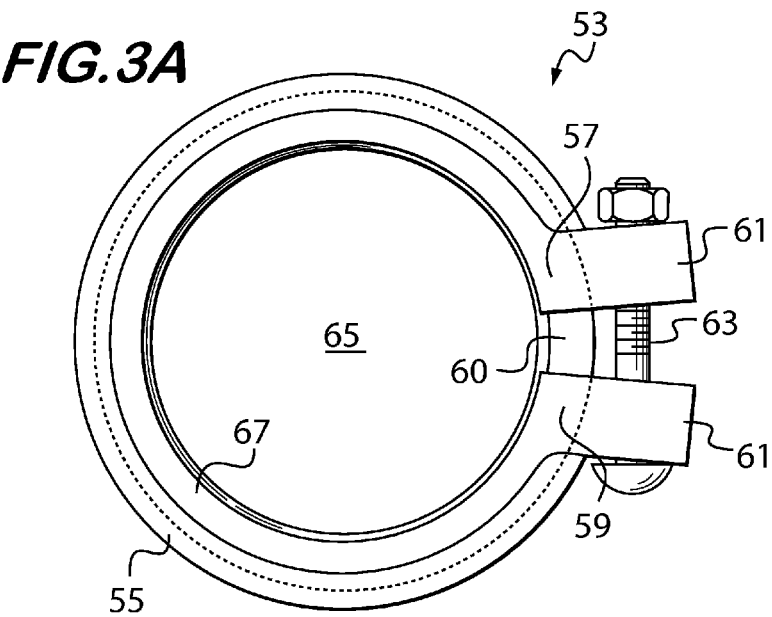
FIGS. 3A and 3B are elevational views of pipe coupling embodiments.
Figure 3B:
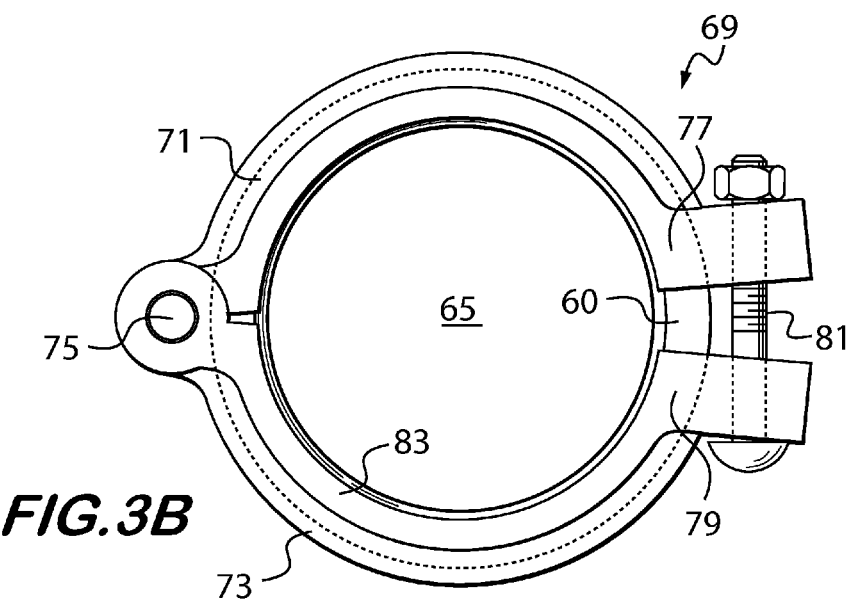

For pipe stock, the configuration of the end of the pipe element 10 (shoulder 22, groove 24 and bead 26) is the same at both ends (not shown for clarity), but other configurations are also feasible wherein the ends may be dissimilar. Furthermore, the pipe elements 50 at opposite ends of valve 14 also have the above-described end configurations which allow the valve, or any other fluid control component or fitting, to be joined to other pipe elements using mechanical couplings, examples of which are shown in FIGS. 3, 3A and 3B. Alternately, valves and other fluid control components and fittings may also have dissimilar end configurations.

In one embodiment, illustrated in FIG. 3, mechanical coupling 52 comprises two or more segments 54 attached to one another in end to end relation, in this example by threaded fasteners 56. The segments 54 surround a central space 58 which receives the pipe elements 10 to join them in a fluid tight joint. An elastomeric gasket 60 is captured between the segments 54 and has inwardly facing sealing surfaces 62 which engage the outwardly facing surfaces 28 of shoulders 22 to ensure fluid tightness. Each segment has a pair of arcuate surfaces or keys 64 which project inwardly toward the central space and are received within the grooves 24 of the pipe elements 10.

In another embodiment, shown in FIG. 3A, the coupling 53 comprises a single segment formed of a unitary body 55 having ends 57 and 59 in spaced apart, facing relation. Bolt pads 61 extend from the ends 57 and 59 and a fastener 63 extends between the bolt pads for drawing them together upon tightening of the fastener. The unitary body surrounds a central space 65 which receives the pipe elements to form a joint. Keys 67 in spaced relation on either side of the coupling 53 extend circumferentially along the unitary body 55 and project radially inwardly. A gasket 60 similar to that as described above is positioned between the keys. Tightening of the fastener 63 draws the keys 67 into engagement with grooves in the pipe elements and compresses the gasket 60 between the unitary body 55 and the pipe elements.

FIG. 3B shows another coupling embodiment 69, formed of two segments 71 and 73 joined at one end by a hinge 75. The opposite ends 77 and 79 of the segments are in spaced apart facing relation and connected by a fastener 81. Segments 71 and 73 also have circumferential keys 83 in spaced relation and a gasket 60 is positioned between them. The segments surround a central space 65 which receives the pipe elements to form a joint. Tightening of the fastener 81 draws the keys 83 into engagement with grooves in the pipe elements and compresses the gasket 60 between the segments and the pipe elements.

A joint may be formed between two pipe elements 10 by first disassembling the coupling 52 (see FIG. 3) and slipping the gasket 60 over an end of one of the pipe elements. The end of the other pipe element is then aligned in proximity with the end of the first pipe element, and the gasket is positioned so as to bridge the small gap between the two pipe element ends, with the sealing surfaces 62 of the gasket engaging respective outer surfaces 28 of the shoulders 22 of each pipe element. Next the coupling segments 54 are positioned surrounding the gasket 60 and the ends of the pipe elements with the keys 64 aligned with respective grooves 24 in each pipe element. Fasteners 56 are then applied and tightened so as to draw the segments toward one another, engage the keys 64 within respective grooves 24 and compress the gasket 60 against the pipe elements so as to form a fluid tight joint.

Figure 4:
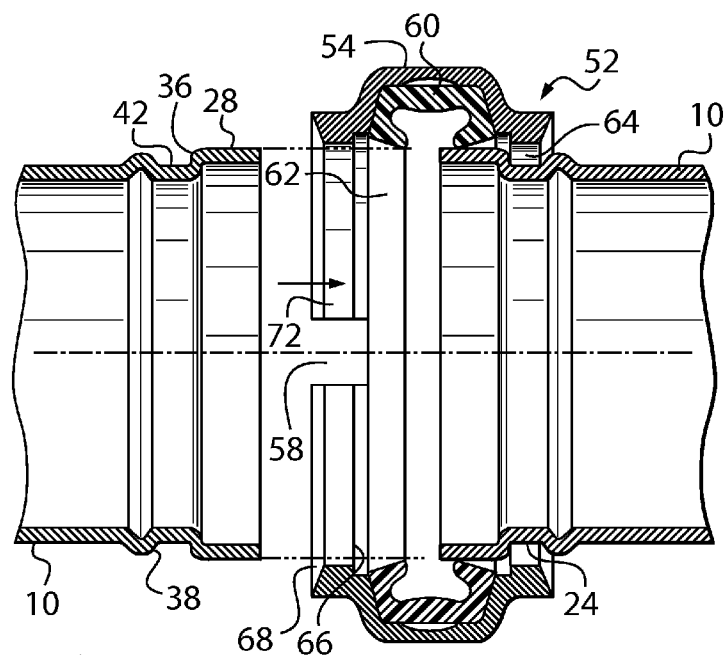
FIGS. 4-6 are longitudinal sectional views of a combination of pipe elements and a pipe coupling.
Figure 5:
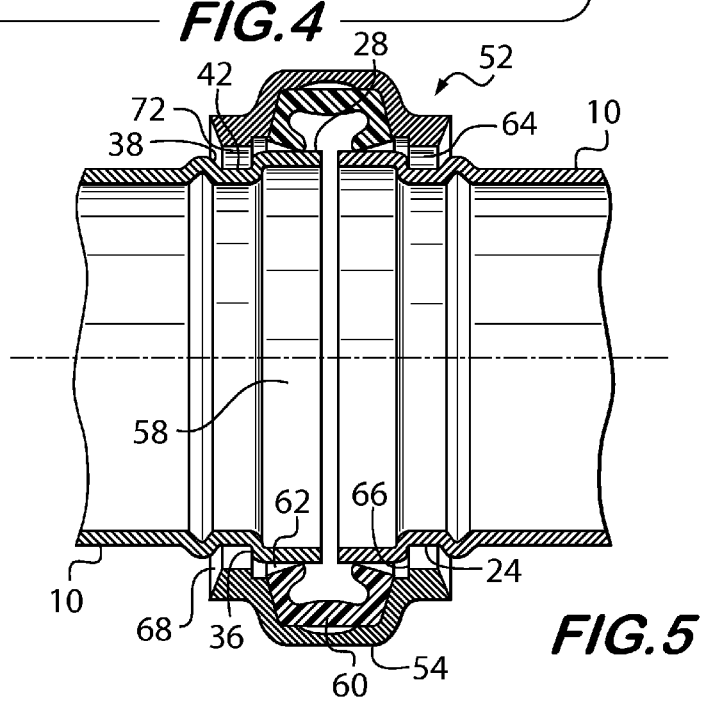
Figure 6:
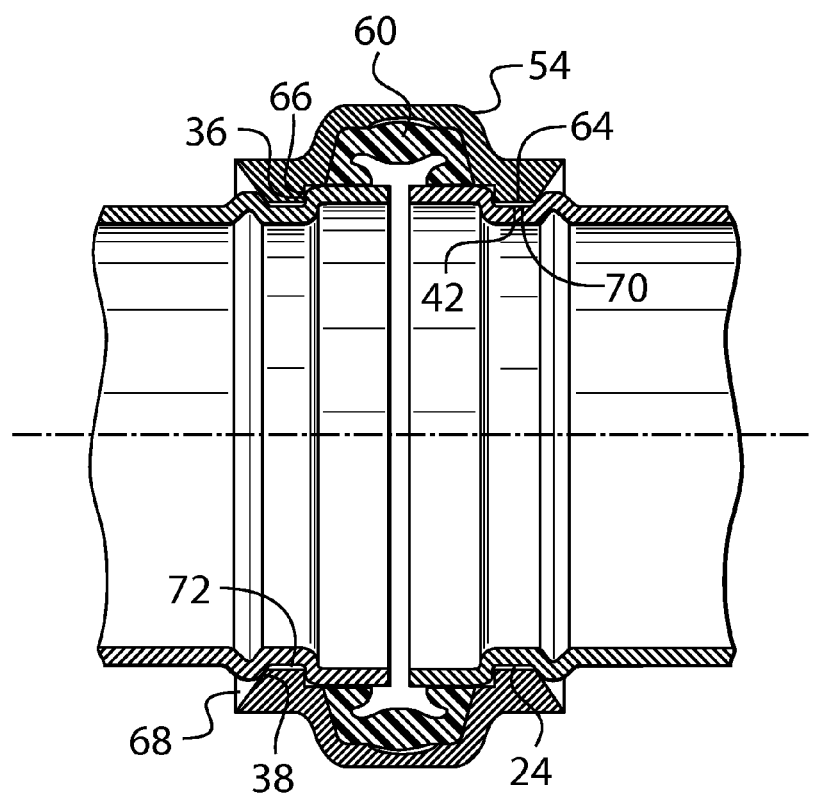

In an alternate embodiment, FIGS. 4-6 show in detail the engagement of the pipe elements 10 with an installation ready type coupling 52 wherein the segments 54 are pre-assembled and held in spaced relation from one another by fasteners 56, the segments being supported on the gasket 60. The segments are sufficiently far apart that the pipe elements 10 may be inserted into the central space 58 without disassembling the coupling as shown in FIGS. 4 and 5. Note that the outwardly facing surfaces 28 of shoulders 22 engage the sealing surfaces 62 of the gasket 60 and the keys 64 align with the grooves 24 in each of the pipe elements. As shown in FIG. 6, the fasteners 56 (see FIG. 1) joining the segments 54 to one another are tightened, drawing the segments toward one another. This compresses the gasket 60 against the pipe elements to effect a seal and forces the keys 64 into the grooves 24 to effect a positive mechanical connection between the coupling and the pipe elements 10 to effect the joint. In one embodiment, shown in detail in FIG. 6, the keys 64 have a cross sectional shape that is compatible with the grooves, and the keys are dimensioned such that a substantially vertical key surface 66 engages the groove first side surface 36, and an angularly oriented key surface 68 engages the angularly oriented second side surface 38 of the groove. It is advantageous that the surfaces 68 and 38 have complementary orientation angles to maximize surface to surface contact. In general for this embodiment there will be a gap 70 between the groove floor surface 42 and a radially facing surface 72 of the key 64. This is due to tolerance variations in both the pipe element and the coupling. Some gap between surfaces 42 and 72 is advantageous to ensure that the keys engage the groove with a wedging action that provides rigidity to the joint and maintains the pipe elements in space relation to one another under axial compression and tension loads. Formation of the joint using coupling embodiments 53 and 69 shown in FIGS. 3A and 3B proceeds similarly as described above for the installation ready embodiment. Other embodiments are also feasible, for example, wherein only the vertical key surface 66 is in contact with the groove first side surface 36, or only the angularly oriented key surface 68 is in contact with the second side surface 38 of the groove 24. It is also possible that the coupling segments float on the gasket 60, wherein none of the key surfaces are in contact with the groove surfaces, at least initially until the joint is subjected to load.

It is advantageous to form the circumferential shoulder, groove and bead using spin forming techniques. Spin forming uses a fixed outer die and a roller tool or "arbor" which revolves in an orbit within the die. The pipe element is held within the die between it and the arbor, and the arbor orbits about the die's longitudinal axis. The arbor's orbit is increased in diameter and the arbor is forced against the inner surface of the pipe element. As the arbor revolves it forces the end of the pipe element to conform in shape to the shape of the arbor and die.

Spin forming is advantageous because it eliminates the sensitivity of the process to the pipe element outer diameter tolerance variation. While techniques such as roll forming may be used to cold work the pipe element and produce the desired shoulder-bead-groove shape, it is difficult to establish the shoulder and the groove outer diameters with an acceptable degree of repeatability due to the variation in pipe element outer diameter. However, by using spin forming with its fixed outer die, the dimensional variations of the pipe element outer diameter are not relevant since the outer die reliably establishes the pipe element's outer surface dimensions regardless of the initial diameter of the pipe element.

FIGS. 7 and 8 schematically depict an example spin forming machine 136. As shown in FIG. 8, the machine 136 includes a die 138 formed in four sections 140, 142, 144 and 146. The die sections are mounted in bearings (not shown) and are slidably moveable toward and away from one another using respective actuators 148, 150, 152 and 154. In this example there are four die sections configured in offset pairs (140 and 142, 144 and 146) but dies having only two sections are also feasible. As shown in FIG. 7, a spin forming tool, arbor 156 is mounted in a housing 158. Housing 158 has a fixed axis of rotation 160 and is mounted on a carriage 162 which moves along guide rods 164 toward and away from the die 138. An actuator 166 effects motion of the carriage 162 and hence motion of the arbor 156 toward and away from the die. Housing 158 is driven in rotation about axis 160 relatively to carriage 162 on bearings 168 by an electric motor 170 also mounted on the carriage. The axis of rotation 160 of housing 158 is substantially parallel to the die's longitudinal axis 161, best shown when the die sections 140, 142, 144 and 146 are brought together. However, the arbor 156 may be moved relatively to the housing 158 in a direction so as to offset its longitudinal axis 172 from the housing axis of rotation 160. Offset motion of the arbor 156 is via an actuator 174 mounted on the housing 158. A spring 176 provides restoring force which moves the arbor's longitudinal axis 172 back into coaxial alignment with the housing axis of rotation 160 when force of the actuator 174 is relieved.

Figure 9:
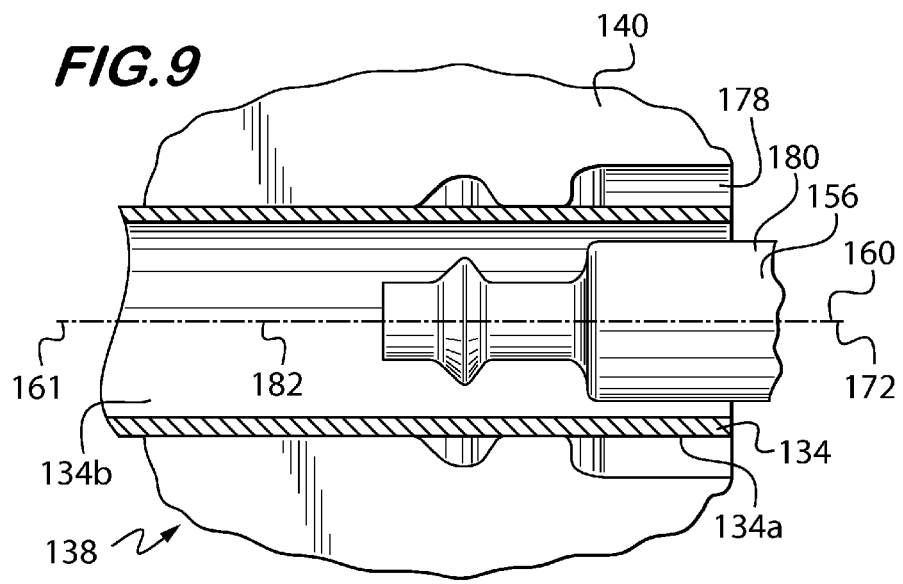
FIGS. 9-11 are longitudinal sectional views illustrating an example method of spin forming pipe elements.

As shown in FIG. 9, the die sections (140 being shown) have an inner surface 178 shaped to produce a desired final shape of the outer surface 134a of the pipe element 134 during spin forming. Furthermore, the arbor 156 has an outer surface 180 shaped to cooperate with the inner surfaces 178 of the die sections and allow the material of the pipe element 134 to deform and flow so that when, during the spin forming process, the outer surface 180 of the arbor 156 is forced against the inner surface 134b of the pipe element 134, the outer surface 134a of the pipe element 134 takes the desired shape defined by the inner surfaces 178 of die 138.

Figure 10:
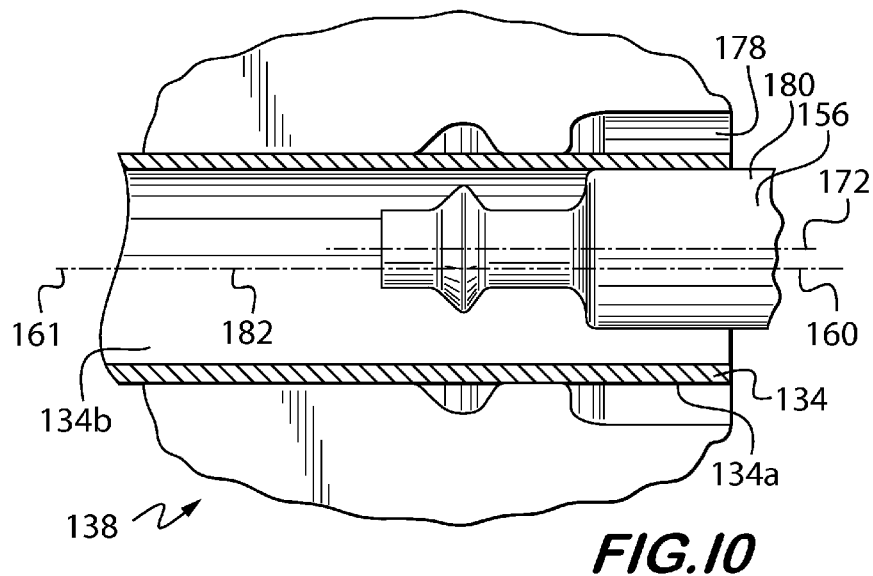
Figure 11:
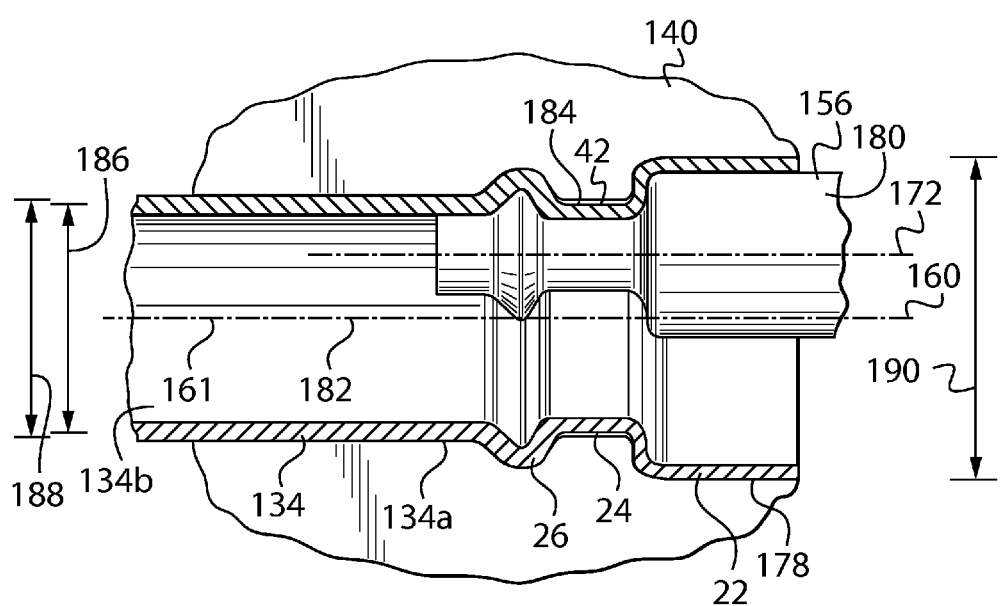

In operation, as illustrated in FIGS. 7-11, actuators 148 and 150 move respective die sections 140 and 142 away from one another. Similarly, actuators 152 and 154 move respective die sections 144 and 146 away from one another, thereby opening the die 138. The pipe element 134 may then be inserted into the die. As shown in FIG. 9, the die 138 is then closed by bringing the respective die sections 140 and 142, 144 and 146 together using their respective actuators to capture the end of the pipe element 134. Next, as shown in FIGS. 7 and 9, actuator 166 moves carriage 162 toward the die 138. Arbor 156 with its longitudinal axis 172 positioned at this time in coaxial alignment with the axis of rotation 160 of housing 158, and hence also in coaxial alignment with both the longitudinal axis 161 defined by the die 138 and the longitudinal axis 182 of the pipe element 134, is moved toward the die 138. The arbor 156 is inserted within the pipe element 134 captured by the die. Housing 158 is then rotated by motor 170 about its axis of rotation 160, and the actuator 174 moves the longitudinal axis 172 of the arbor 156 out of coaxial alignment with the longitudinal axis 160 of the housing. This configuration is shown in FIG. 10, where the axis 172 of arbor 156 is also offset from the longitudinal axis 182 of pipe element 134 as well as the die axis 161. This eccentric configuration causes the arbor 156 to revolve around the longitudinal axis 161 of the die 138 and the longitudinal axis of the pipe element 134 in a circular orbit upon rotation of the housing 158. The diameter of the orbit increases as the actuator 174 continues to move the arbor 156 further off the axis of rotation 160 of the housing 158. Continued motion of the arbor 156 relative to housing 158, while the housing is rotating, forces the arbor against the inner surface 134b of the pipe element 134. As shown in FIG. 11, the arbor 156 travels around the pipe element inner surface in its orbit and cold works the material, forcing the outer surface 134a of the pipe element 134 to substantially conform to the shape of the inner surfaces 178 of the die 138. In this example, the shoulder 22, groove 24 and bead 26 are formed. However, it is also possible to form only a shoulder and the groove, or only the bead and the groove, depending on the shape of the die and the arbor. Note that to mitigate friction between the arbor 156 and the inner surface 134b of the pipe element 134, the arbor is free to rotate about its longitudinal axis 172. Once the desired shoulder-bead-groove shape is achieved upon completion of the spin forming process, rotation of housing 158 is halted, the longitudinal axis 172 of the arbor 156 is moved back into alignment with the housing longitudinal axis 160 and die axis 161, and the carriage 162 is move away from the die 138, thereby removing the arbor 156 from within pipe element 134. Die 138 is then opened by moving the die sections 140, 142, 144 and 146 apart, thereby allowing removal of the formed pipe element from the die.

Figure 12:
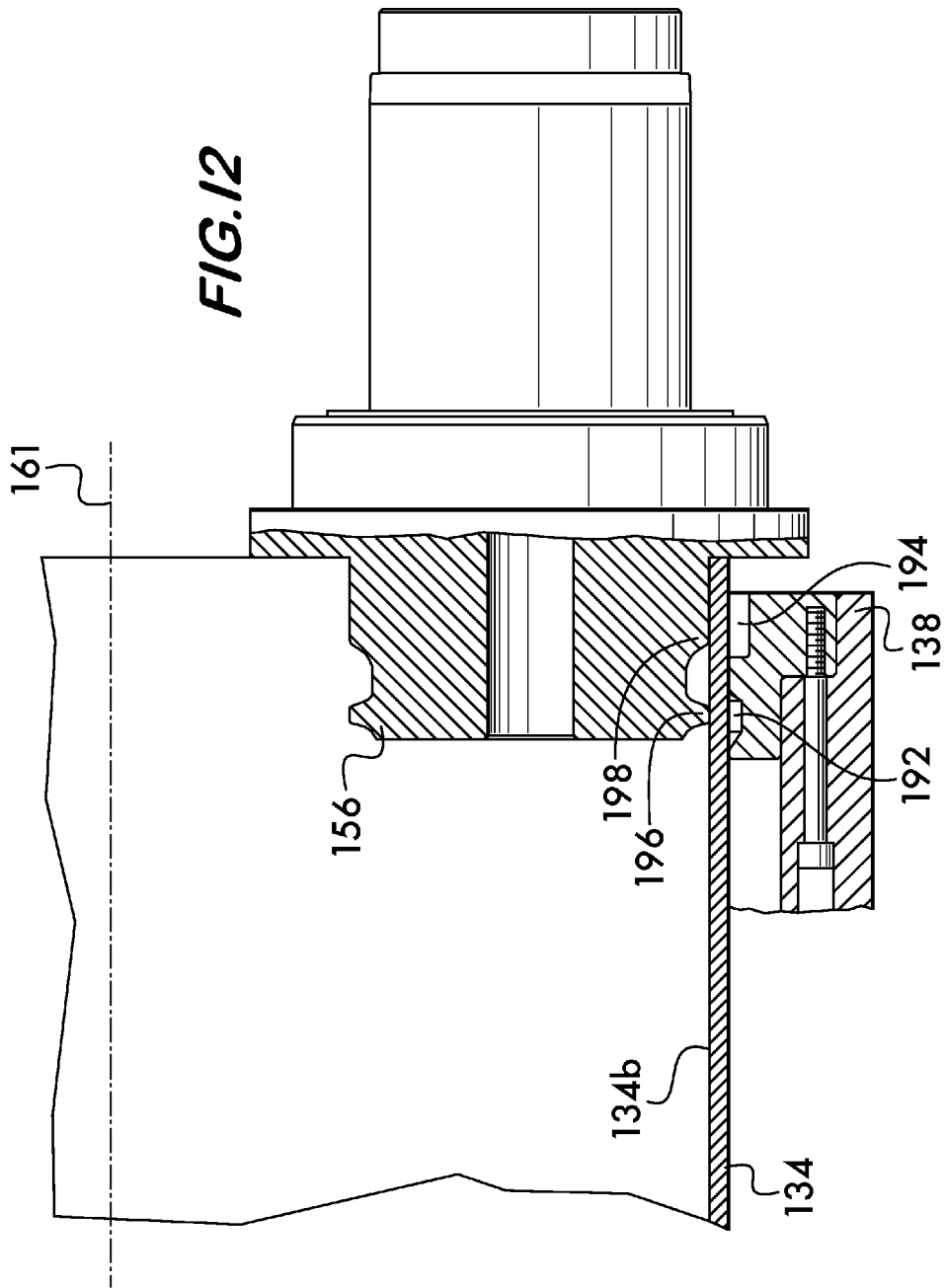
FIGS. 12-15 are longitudinal sectional views illustrating an example method of spin forming in detail.

FIGS. 12-15 illustrate in detail an example method for spin forming a groove 24, as well as a shoulder 22 and bead 26 in a pipe element 134. As shown in FIG. 12, the arbor 156, moving it its eccentric orbit of increasing diameter about the die longitudinal axis 161, is shown just as it contacts the inner surface 134b of pipe element 134. In this example, die 138 has first and second circumferential troughs 192 and 194, arranged in spaced apart relation to one another. Arbor 156 has first and second circumferential ribs 196 and 198. Note that upon insertion of the arbor 156 into the pipe element 134, the first rib 196 is aligned with the first trough 192, and the second rib 198 is aligned with the second trough 194.

Figure 13:
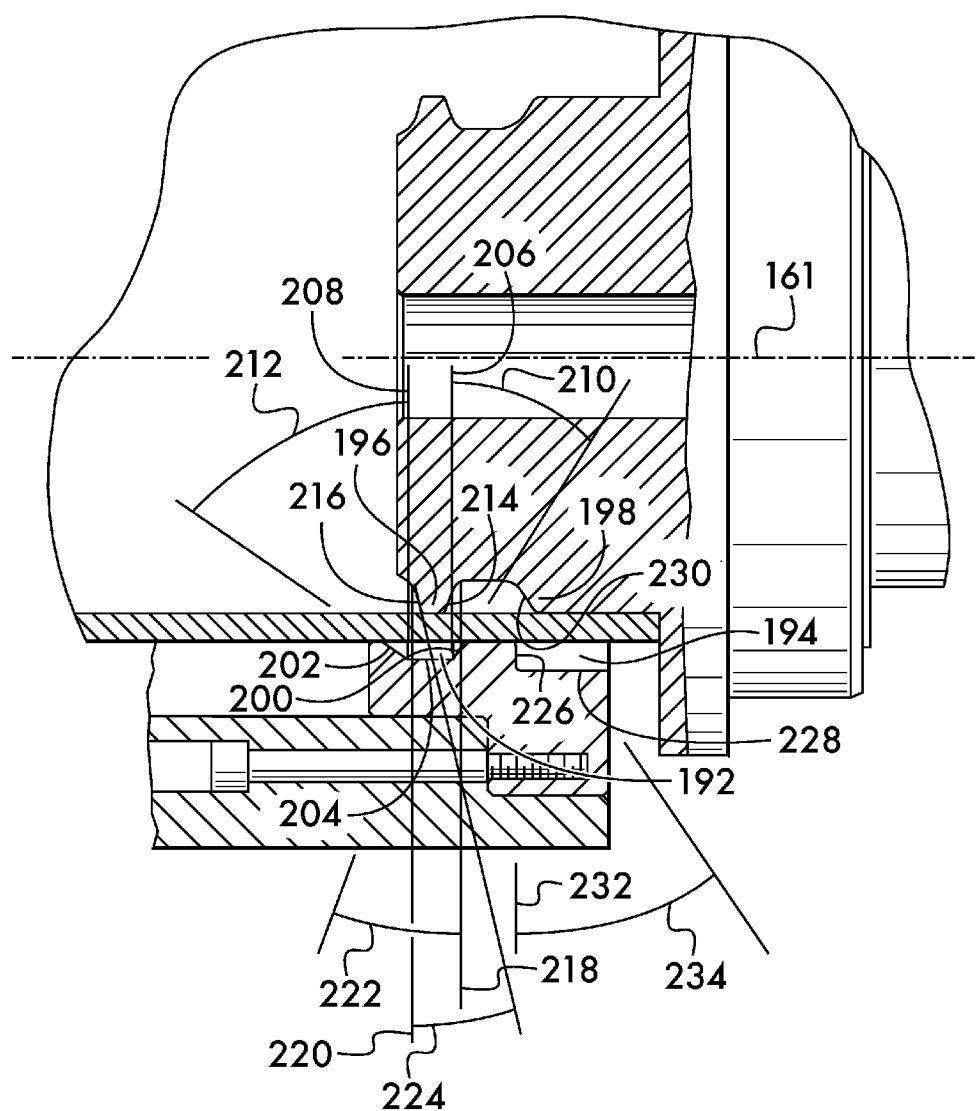

As shown in FIG. 13, the first trough 192 is defined by a first side surface 200 positioned proximate to the second trough 194, a second side surface 202 positioned distal to the second trough 194, and a floor surface 204 that extends between the first and second side surfaces 200 and 202. Note in this example that the first and second side surfaces are angularly oriented with respect to respective datum lines 206 and 208 which extend perpendicular to the die axis 161. In some embodiments the orientation angle 210 of the first side surface is less than the orientation angle 212 of the second side surface 202 (as shown). The orientation angle 210 of the first side surface 200 may range from about 20° to about 50°, and the orientation angle 212 of the second side surface 202 may range from about 20° to about 75°.

The first rib 196 comprises first and second flank surfaces 214, 216 positioned on opposite sides of the rib. First flank surface 214 faces toward the first side surface 200 of the first trough 192, and the second flank surface 216 faces toward the second side surface 202. The first and second flank surfaces 214 and 216 are angularly oriented with respect to respective datum lines 218 and 220 which extend perpendicular to the die axis 161. The orientation angle 222 of the first flank surface 214 may range from about 10° to about 55°, and the orientation angle 224 of the second flank surface 216 may range from about 10° to about 75°.

In this example embodiment, the second trough 194 is defined by a side surface 226 positioned proximate to the first trough 192, and a floor surface 228 that is contiguous with the side surface 226. In this example, the side surface 226 is oriented substantially perpendicular to the die axis 161, although it may also be angularly oriented. Side surface 226 and floor surface 228 cooperate to define the shoulder 22 (see FIGS. 13 and 14).

The second rib 198 comprises a flank surface 230 positioned facing toward the side surface 226 of the second trough 194. Flank surface 230 may, as shown, be angularly oriented with respect to a datum lines 232 which extends perpendicular to the die axis 161. The orientation angle 234 of the flank surface 230 may range from about 1° to about 45°.

Figure 14:
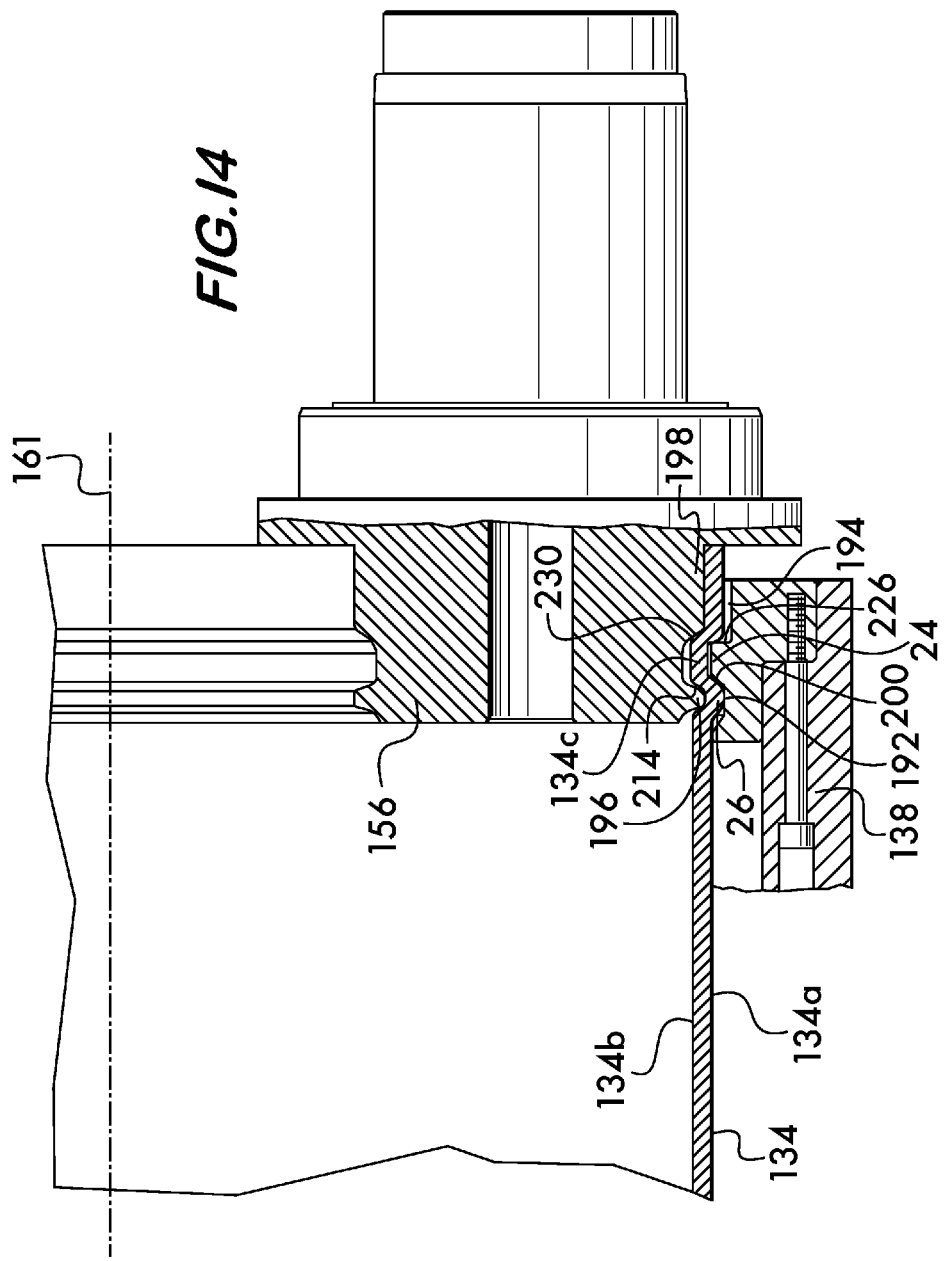
Figure 15:
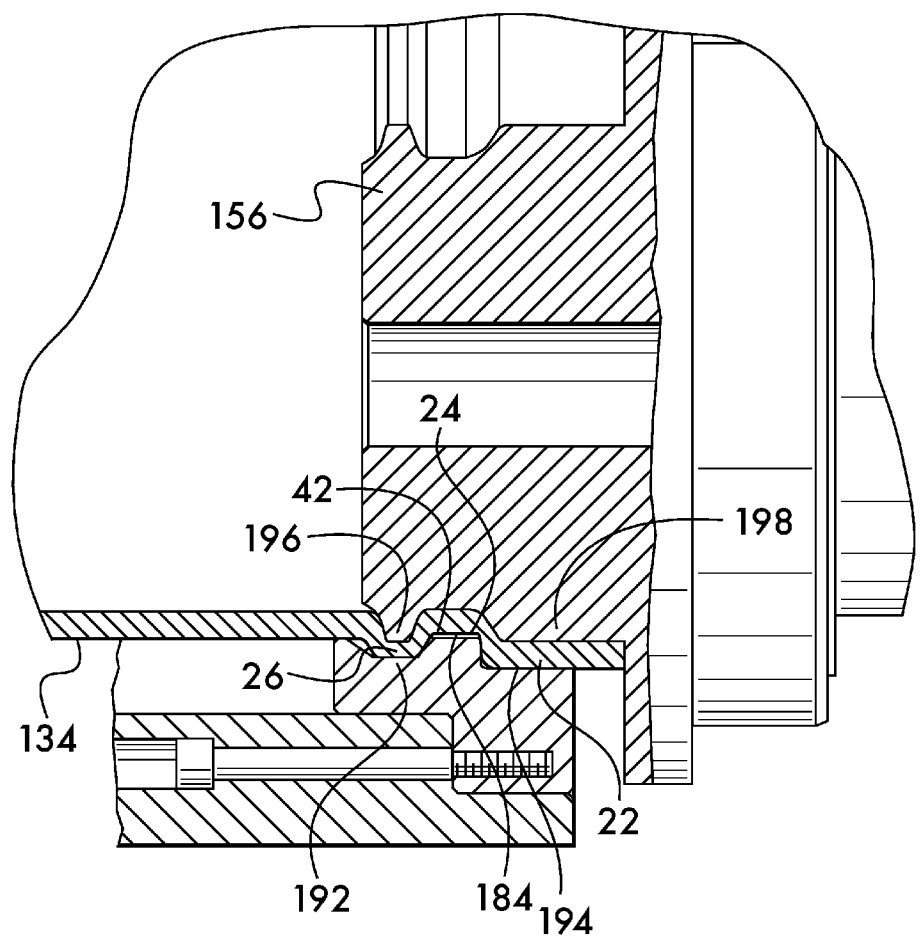

With reference to FIG. 14, as the arbor 156 revolves in its orbit of increasing diameter, the pipe element 134 is pinched between the first flank surface 214 of the first circumferential rib 196, and the first side surface 200 of the first trough 192. When this pinching is effected, it is observed that groove 24 is formed in the outer surface 134a of the pipe element 134 wherein a portion 134c of the pipe element moves radially inwardly away from the die 138, as evidenced by the gap 184 between floor 42 of the groove 24 and the die 138 as shown in FIG. 15. As also shown in FIG. 14, further pinching of the pipe element 134 occurs between the flank surface 230 of the second circumferential rib 198 and the side surface 226 of the second trough 194, which is thought to contribute to the formation of the groove 24 by facilitating movement of the portion 134c radially inwardly away from the die 138. As shown in FIG. 11, the groove 24 thus formed in pipe element 134 has an outer diameter 186 which is less than the outer diameter 188 of the rest of the pipe element. In this example method, the shoulder 22 and bead 26 are further formed, respectively, by forcing the second circumferential rib 198 toward the second circumferential trough 194 and the first circumferential rib 196 toward the first circumferential trough 192 as shown in FIG. 15.

The radial inward motion of the region 134c of the pipe element 134 away from the die 138 to form the gap 184 is contrary to the radially outward motion of the arbor 156 and is thus unexpected. This method allows pipe elements 134 (as shown in FIG. 11) to be formed wherein the outer surface 134a of the groove 24 has a diameter 186 less than the diameter 188 of the outer surface of the remainder of the pipe element; i.e., the outer surface 134a of the pipe element exclusive of the groove 24. It was previously thought that such a configuration was possible only by roller forming of the pipe element between two rotating rollers, but spin forming according to the invention allows this configuration to be achieved while maintaining precise and repeatable outer dimensions of the pipe element due to the effect of the fixed die capturing the pipe element. This is unexpected because it was thought that spin forming could only expand a pipe element; i.e., any part of a pipe element deformed by spin forming must have a diameter larger than the original dimension. Therefore, according to the common wisdom, it would not be possible, in a spin forming process, to start with a pipe element having a first outer diameter and end up with a portion of the pipe element having a second outer diameter smaller than the first outer diameter, but applicants have achieved this using spin forming in the method according to their invention.

The pipe element configurations comprising the shoulder, groove and bead, and the methods and apparatus for creating the configurations as shown and described herein allow thin walled pipe elements to be joined by mechanical couplings and used in high pressure/high load applications previously thought unsuited for thin walled pipe elements and grooved mechanical couplings. Various additional advantages over prior art pipe elements are also realized. For example, it is known that the outer diameter 186 of the groove floor 42 is an important dimensional parameter for compatibility between couplings and pipe elements in view of pipe element diameter manufacturing tolerances. The spin forming method disclosed herein permits this parameter to be controlled so that grooves can be formed that are compatible with couplings at both the maximum and minimum pipe diameter tolerances. Furthermore, the combination of the enlarged shoulder diameter 190 (shoulder 22 outwardly facing surface larger than the pipe element outer diameter) and the reduced groove floor diameter (groove floor 42 outer diameter less than the pipe element outer diameter) allows lighter weight couplings to be used without a performance penalty. It is also easier to design the couplings due to the tighter tolerances to which the groove and shoulder dimensions can be held. Practically, this translates into lower cost couplings at lower weight, and stronger joints withstanding higher internal pressures. Gasket design is also simplified because of the tighter tolerances afforded, and it is easier to manage the size of the gap which forms between coupling segments through which the gasket can be extruded and blow-out under high pressures. Manufacturing advantages are also secured as there is less thinning of the pipe element and less cold working required which means lower residual stresses, higher remaining elongations, and stronger pipe elements. The addition of the bead 26 permits a more rigid joint and allows the key to fill the groove and employ a wedging action to advantage. The wedging action holds the pipe elements within the coupling at a constant distance even when under axial compression, due, for example to thermal loads or a vertical pipe stack. This prevents the pipe elements from pinching and damaging the gasket center leg if present. The enlarged shoulder also permits the groove to be relatively shallow and present a lower internal profile within the pipe element. A lower profile groove at each joint causes less head loss and less turbulence in the fluid flowing through the pipe elements. Additionally, by forming the groove concentric with the shoulder a more uniform engagement between the coupling and the pipe elements is achieved, further lessening the likelihood of leaks.

What is claimed is:

1. A method of forming a groove in an outer surface of a pipe element, said method comprising:
   capturing an end of said pipe element in a die having first and second circumferential troughs arranged in spaced apart relation to one another;
   inserting an arbor within said pipe element, said arbor having a first circumferential rib aligned with said first circumferential trough and a second circumferential rib aligned with said second circumferential trough;
   revolving said arbor in an orbit about a longitudinal axis of said die;
   increasing the diameter of said orbit while revolving said arbor so as to force said arbor against an inner surface of said pipe element;
   pinching said pipe element between said first circumferential rib and said first circumferential trough while revolving said arbor in said orbit of increasing diameter, thereby causing a portion of said pipe element between said first and second circumferential troughs to move radially inwardly away from said die such that a gap exists between said die and said pipe element thereby forming said groove, said groove having a smaller outer diameter than the outer diameter of the remainder of said pipe element.

2. The method according to claim 1, wherein said first circumferential trough comprises a first side surface positioned proximate to said second circumferential trough, a second side surface positioned distal to said second circumferential trough, and a floor surface extending between said first and second side surfaces, said method further comprising pinching said pipe element between said first circumferential rib and said first side surface.

3. The method according to claim 2, wherein said first side surface is oriented at a first orientation angle, said second side surface is oriented at a second orientation angle, said first orientation angle being less than said second orientation angle when measured relatively to a datum line extending perpendicular to said longitudinal axis of said die.

4. The method according to claim 2, wherein said first side surface is oriented at an orientation angle from 20° to 50° measured with respect to a datum line extending perpendicular to said longitudinal axis of said die.

5. The method according to claim 2, wherein said second side surface is oriented at an orientation angle from 20° to 75° measured with respect to a datum line extending perpendicular to said longitudinal axis of said die.

6. The method according to claim 2, wherein said first circumferential rib comprises first and second flank surfaces positioned on opposite sides thereof, said first flank surface facing toward said first side surface, said second flank surface facing toward said second side surface, said pipe element being pinched between said first flank surface and said first side surface.

7. The method according to claim 6, wherein at least one of said first and second flank surfaces is angularly oriented with respect to a datum line extending perpendicular to said longitudinal axis of said die.

8. The method according to claim 6, wherein said first flank surface is oriented at an orientation angle from 10° to 55° measured with respect to a datum line extending perpendicular to said longitudinal axis of said die.

9. The method according to claim 6, wherein said second flank surface is oriented at an orientation angle from 10° to 75° measured with respect to a datum line extending perpendicular to said longitudinal axis of said die.

10. The method according to claim 1, wherein said second circumferential trough comprises:
    a side surface positioned proximate said first circumferential trough;
    a floor surface contiguous with said side surface of said second circumferential trough, said method further comprising pinching said pipe element between said second circumferential rib and said side surface of said second circumferential trough.

11. The method according to claim 10, wherein said side surface of said second circumferential trough is oriented substantially perpendicular to said longitudinal axis of said die.

12. The method according to claim 10, wherein said second circumferential rib comprises a flank surface facing toward said side surface of said second circumferential trough, said method further comprising pinching said pipe element between said flank surface of said second circumferential rib and said side surface of said second circumferential trough.

13. The method according to claim 12, wherein said flank surface of said second circumferential rib is angularly oriented with respect to a datum line extending perpendicular to said longitudinal axis of said die.

14. The method according to claim 12, wherein said flank surface of said second circumferential rib is oriented at an orientation angle from 1° to 45° measured with respect to a datum line extending perpendicular to said longitudinal axis of said die.

15. The method according to claim 1, further comprising forming a shoulder in an end portion of said pipe element by forcing said second circumferential rib toward said second circumferential trough.

16. The method according to claim 1, further comprising forming a bead in said pipe element adjacent to said groove by forcing said first circumferential rib toward said first circumferential trough.

17. A method of forming a bead, a groove and a shoulder in an outer surface of a pipe element, said method comprising:
    capturing an end of said pipe element in a die having first and second circumferential troughs arranged in spaced apart relation to one another;
    inserting an arbor within said pipe element, said arbor having a first circumferential rib aligned with said first circumferential trough and a second circumferential rib aligned with said second circumferential trough;
    revolving said arbor in an orbit about a longitudinal axis of said die;
    increasing the diameter of said orbit while revolving said arbor so as to force said arbor against an inner surface of said pipe element;
    said bead being formed by forcing said first circumferential rib toward said first circumferential trough;
    said shoulder being formed by forcing said second circumferential rib toward said second circumferential trough;
    said groove being formed between said bead and said shoulder by pinching said pipe element between said first circumferential rib and said first circumferential trough while revolving said arbor in said orbit of increasing diameter, thereby causing a portion of said pipe element between said first and second circumferential troughs to move radially inwardly away from said die such that a gap exists between said die and said pipe element thereby forming said groove, said groove having a smaller outer diameter than the outer diameter of the remainder of said pipe element.

18. The method according to claim 17, wherein said first circumferential trough comprises a first side surface positioned proximate to said second circumferential trough, a second side surface positioned distal to said second circumferential trough, and a floor surface extending between said first and second side surfaces, said method further comprising pinching said pipe element between said first circumferential rib and said first side surface.

19. The method according to claim 18, wherein said first side surface is oriented at a first orientation angle, said second side surface is oriented at a second orientation angle, said first orientation angle being less than said second orientation angle when measured relatively to a datum line extending perpendicular to said longitudinal axis of said die.

20. The method according to claim 17, wherein said first circumferential rib comprises first and second flank surfaces positioned on opposite sides thereof, said first flank surface facing toward said first side surface, said second flank surface facing toward said second side surface, said pipe element being pinched between said first flank surface and said first side surface.

21. The method according to claim 20, wherein at least one of said first and second flank surfaces is angularly oriented with respect to a datum line extending perpendicular to said longitudinal axis of said die.

22. The method according to claim 17, wherein said second circumferential trough comprises a side surface positioned proximate said first circumferential trough and a floor surface contiguous with said side surface of said second circumferential trough, said method further comprising pinching said pipe element between said second circumferential rib and said side surface of said second circumferential trough.

23. The method according to claim 22, wherein said side surface of said second circumferential trough is oriented substantially perpendicular to said longitudinal axis of said die.

24. The method according to claim 22, wherein said second circumferential rib comprises a flank surface facing toward said side surface of said second circumferential trough, said method further comprising pinching said pipe element between said flank surface of said second circumferential rib and said side surface of said second circumferential trough.

25. The method according to claim 24, wherein said flank surface of said second circumferential rib is angularly oriented with respect to a datum line extending perpendicular to said longitudinal axis of said die.

26. The method according to claim 24, wherein said flank surface of said second circumferential rib is oriented at an orientation angle from 1° to 45° measured with respect to a datum line extending perpendicular to said longitudinal axis of said die.

* * * * *